United States Patent [19]
Asselta

[11] 3,990,146
[45] Nov. 9, 1976

[54] PLANT CUTTING AND LIFTING DEVICE
[75] Inventor: Carl Asselta, Vineland, N.J.
[73] Assignee: Lawrence Peska Associates, Inc., New York, N.Y. ; a part interest
[22] Filed: July 24, 1975
[21] Appl. No.: 598,660

[52] U.S. Cl. .................................. 30/134; 7/1 L; 294/50.9
[51] Int. Cl.² ........................................ A01B 1/18
[58] Field of Search ............... 294/19 R, 50.5, 50.6, 294/50.8, 50.9, 51, 104; 7/1 L, 5.1, 5.3, 5.4, 5.6; 30/131, 134, 135, 145, 187, 190, 248, 249, 251; 56/332–336; 172/378; 254/132

[56] References Cited
UNITED STATES PATENTS

| 1,069,106 | 8/1913 | Brice | 30/145 X |
| 1,814,216 | 7/1931 | Hartwell | 294/50.9 |
| 1,908,322 | 5/1933 | Cook | 294/50.9 |
| 1,989,932 | 2/1935 | Junkin | 294/50.9 |
| 2,373,872 | 4/1945 | Couture | 294/50.9 |
| 2,579,584 | 12/1951 | Kachelhoffer | 30/135 |
| 3,284,896 | 11/1966 | Reichborn-Kjennerud | 30/134 |

Primary Examiner—Johnny D. Cherry

[57] ABSTRACT

A plant cutting and plant lifting device that includes a shearing blade and a hand actuated cutting and grasping member, thereby eliminating or substantially reducing the bending of the operator's body.

3 Claims, 3 Drawing Figures

PLANT CUTTING AND LIFTING DEVICE

BACKGROUND OF THE INVENTION

This invention relates to a plant cutter and a plant puller. More particularly, the invention relates to a device that reduces or eliminates the bending heretofore associated with the removal of weeds and the like from the soil. The device includes a digging and cutting fork as well as a hand actuated cutting and plant grasping jaw. The cutting and grasping jaw is employed in conjunction with the shearing fork, while the latter may be operated independently of the former.

The prior art teaches a variety of devices that may be employed in weeding a garden, for example, U.S. Pat. Nos.: 1,624,442; 1,908,322; 2,000,219; 2,029,155; 2,373,872; 2,554,911; 2,660,467; 2,770,483; 2,806,733; 2,905,498; 3,272,548; 3,369,834; 3,463,244; and others. These devices are deficient however, in that they fail to provide for both a shearing fork and a hand actuated cutting and plant grasping means adapted to work in conjunction therewith.

SUMMARY OF THE INVENTION

It is accordingly an object of the instant invention to avoid one or more drawbacks of the prior art.

It is another object of the invention to provide for a new and improved gardening device.

It is a further object of the invention to accomplish the foregoing with a simply operated and easily constructed device.

These and other objects of the invention will become more apparent from the following detailed disclosure and claims, and by reference to the accompanying drawings, in which:

Broadly speaking, the instant invention includes the provision of a weed cutter and pick up device comprising an elongated shank having a gripping handle at one end thereof and a double pronged spading head at the other end thereof, the head being substantially planar and defining a first cutting edge and a pair of tapered knives with a bifurcation therebetween adapted to cut the stem of a weed, a pull rod mounted on the shank and having a handle in communication with one end thereof adjacent the handle of the shank and coacting therewith to permit manual manipulation of the pull rod, an arm including a substantially planar arcuate finger portion and a terminal portion thereof, the arm defining a second cutting edge, the arm pivotably mounted for communication with the head, resilient means for biasing the arm into a normally open position away from the head, means for coupling the pull rod to the arm, the terminal portion being adapted to contact the head when the resilient means are actuated whereby the weeds are grasped thereby, the first and second knife edges cooperating in scissor arrangement simultaneous with the actuation whereby weeds may be severed therebetween and simultaneously grasped between the terminal portion and the head.

DETAILED DISCLOSURE

Figure 1:
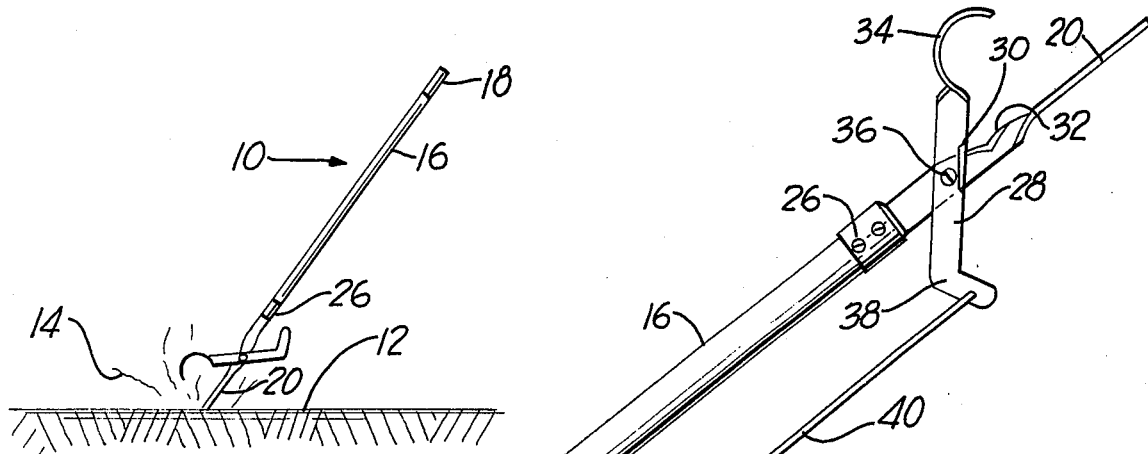
FIG. 1 is a side elevational of the device in one position relative to the ground.
Figure 2:
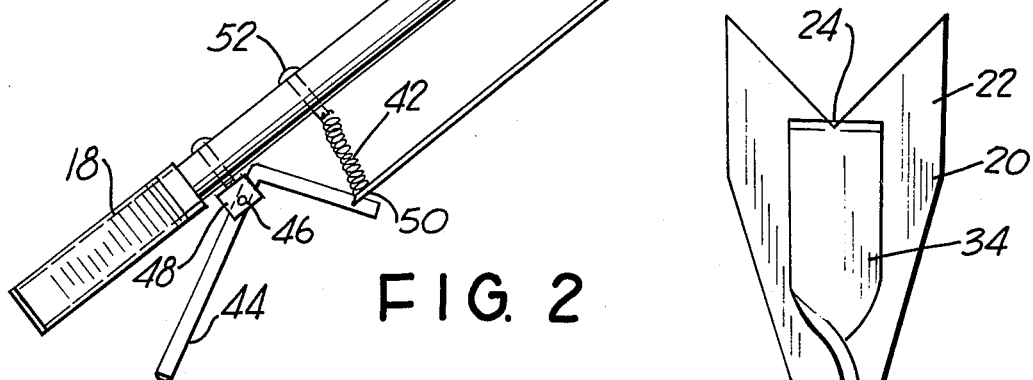
FIG. 2 is similar to FIG. 1 but in greater detail.
Figure 3:
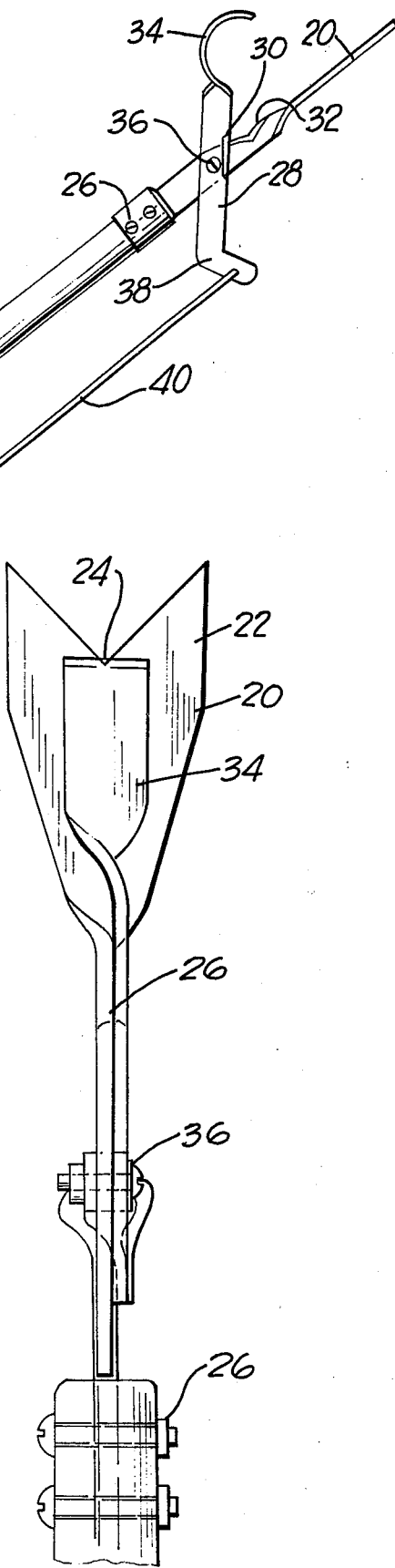
FIG. 3 is a top plan view of the shearing edge and cutting blade.

Referring more particularly to the drawings, in which like elements are designated by like characters, there is shown the instant device 10 in an inclined position against the ground 12 in position to work against the flora 14 thereof. The device includes an elongated shank 16 having a gripping handle 18 at one distal end thereof. The opposite distal end of the shank 16 is integral with a double pronged spading head 20 that has a pair of tapered knives 22 with a slot or bifurcation 24 between the same into which the weed or plant to be cut is received and severed from its root. Head 20 is connected to shank 16 by any suitable means 26 such as rivets, bolts and the like. If desired, head 20 may be unitary and machine tooled from shank 16. A pivotable arm 28 defining a first cutting edge 30 disposed along its surface is engaged to shank 16 or to head 20. The first cutting edge 30 communicates with a complimentary second cutting edge 32 disposed on either the shank 16 or head 20. Preferably the second cutting edge 32 is on head 20 as is the arm 28 disposed on head 20. A substantially planar arm 28 terminates in an arcuate finger 34 that is adapted to engage head 20 downstream of the double fork edge 22, whereby cut weeds may be grasped by the finger 34 when disposed against head 20. Finger 34 is biased in a normally open position as shown in FIGS. 1 and 2 relative to head 20, in which position the finger does not interfere with the cutting operation of the forked edge 22. Arm 28 is pivotable about pivot pin 36 on shank 16 and movable relative thereto such that finger 34 is adapted to communicate with head 20 as shown in FIG. 3. A substantial gripping surface is thereby provided between finger 34 and head 20, against both sides of the weed which has been cut by the scissor action of edges 30 and 32 against each other, or by the knife edge 24.

The shank portion 38 of arm 28 is pivotably mounted through a pullman rod 40 which cooperates with a resilient means 42, i.e., spring and a pivotably mounted trigger-handle 44.

The operation of the present device is such that the resilient means 42 biases the pull rod 40 in a downward direction so that the arm 28 remains in a normally open position. The arm 28 pivots about pin member 36 on preferably the head 20. Trigger-handle 44 pivots about pin member 46 of clevis member 48 attached to the lower end of the shank 16 near the gripping means 18. A further portion of handle 44 is in simultaneous communication between one end of resilient means 42 and the opposite distal end 50 of rod 40 by common engagement such as by both 42 and 46 being simultaneously attached through an eyelet, ring or the like. The opposite distal end of resilient member 42 is in communication by suitable connecting means 52, i.e., bolt or the like, to the shank 16. The opposite distal end of rod 40 engages the free distal end of arm 28 at portion 38.

Upon the application of hand pressure to handle 44 the same pivots upward towards gripping means 18 whereupon resilient means 42 is tensioned causing retraction of rod 40 towards handle 44 thereby causing the arm 28 to be pivoted about pin member 36 thereby causing finger 34 to move in an arc towards head 20 with the resultant cross actuation of scissor edges 30 and 32 and the ultimate engagement and contact of member 34 against head 20.

Since it is obvious that numerous changes and modifications can be made in the above-described details without departing from the spirit and nature of the invention, it is to be understood that all such changes and modifications are included within the scope of the invention.

I claim:

1. A weed cutter and pick up device comprising an elongated shank having a gripping handle at one end thereof and a double pronged spading head at the other end thereof, said head being substantially planar and defining a first cutting edge and spaced apart therefrom a pair of tapered knives with a bifurcation therebetween adapted to cut the stem of a weed, a pull rod mounted on said shank and having a handle in communication with one end thereof adjacent said gripping handle and coacting therewith to permit manual manipulation of said pull rod, a substantially planar arm including an arcuate finger portion at a terminal portion thereof, said arm defining a second cutting edge, said arm pivotably mounted for communication with said head, resilient means for biasing said arm into a normally open position away from said head, means for coupling said pull rod to said arm, said terminal portion being adapted to contact said head when said handle is actuated whereby said weeds are cut and grasped thereby, said first and second cutting edges cooperating in scissor arrangement simultaneous with said actuation whereby weeds may be severed therebetween and simultaneously grasped between said finger portion and said head.

2. The device as defined in claim 1 wherein said resilient means is a spring.

3. The device as defined in claim 1 wherein said arm is disposed on a lateral side of said head.

* * * * *